UNITED STATES PATENT OFFICE 2,322,194

PROCESS FOR MAKING CEMENT PRODUCTS

George D. King, Chicago, Ill., assignor to United States Gypsum Company, Chicago, Ill., a corporation of Illinois No Drawing. Application August 14, 1939, Serial No. 289,978

1 Claim. (Cl. 106—88)

The present application is a continuation in part of my application Serial No. 125,554, filed on February 13, 1937.

The present invention relates to an improved form of cementitious product and a process for its production.

One of the objects of the invention is to produce an improved product made from calcined gypsum which has been toughened by having had admixed therewith during its production a fine, unaggregated cellulosic fiber of such a nature that it can be thoroughly and quickly disseminated throughout the mixture of calcined gypsum and the gaging fluid wherein this fiber is added while dry so that it will not carry any additional water into the product but rather will have a tendency to absorb some of the water, thereby rendering the mixture of calcined gypsum and water more mortar-like in consistency and less fluid.

A further object of the invention is to produce a gypsum product in which a slurry of calcined gypsum and water has added thereto a dry cellulosic fiber of the particular type hereinafter fully described, the incorporation of the fiber being effected so rapidly that it will absorb but little water, the speed of mixing and molding of the mix being so adjusted that it will be molded into the desired form before the fiber has taken up enough water to harden the mass beyond the plastic state, which, if it did occur, would require the addition of more water initially.

A further object of the invention is to produce, for example, wallboard having a gypsum core with which there has been incorporated, during its manufacture, a tenacious foam, either prepared separately or formed in situ, which has been protected against premature collapse by the addition to the gypsum core composition of a special form of fine cellulosic fiber such as may be produced by finely grinding newsprint or old newspapers and the like.

A further object of the invention is the production of gypsum products containing foam and a specially prepared fine paper fiber.

Another object of the invention is the preparation of a gypsum core composition from calcined gypsum, water and a foam, the bubbles of which have been protected against collapse by the use of a finely ground paper fiber or its equivalent.

A further object of the invention is to prepare wall board having a gypsum core which has been stiffened, partially solidified, and partially dewatered by means of dry paper fibers, the wallboard having thereby a smoother face, truer edges, and a better bond of the core to the liners.

A further object of the invention is to produce a cement product toughened by means of paper fibers which have been added dry and quickly mixed in, whereby they do not carry an excess of absorbed water into the cement product.

Other objects of the invention will become apparent from the more detailed description to follow hereinbelow.

Generally speaking, the invention relates to the use of a special type of discrete paper fiber, preferably made from ordinary newspaper, magazine paper, chip paper, and the like, which has been disintegrated into substantially individual small fibers by a suitable method of grinding, one of which will be described further herein, this fiber being introduced to form a slurry with water and calcium sulfate hemihydrate cement, sometimes known as calcined gypsum, stucco, plaster of Paris, and by other names, followed by the formation of the resulting mixture into definite shapes, whereafter the plaster sets to form the finished object which it is desired to produce. Obviously, the method may be employed for the manufacture of poured, cast, or molded objects of a variety of shapes, but for purposes of simplicity the invention will be described in greater detail in connection with the manufacture of a widely known type of gypsum product, namely, gypsum wallboard. It is to be understood, however, that the invention is by no means to be limited by the fact that a more detailed description is given of the manufacture of wallboard, and the invention is therefore to be construed as broadly to cover what is set forth in the hereunto appended claims.

I have found that when carrying out the process of my present invention I am able to produce a satisfactory board having an excellent core endowed with the properties of toughness, satisfactory bond with the cover sheets, smooth surfaces, well formed edges, and, if desired, low weight.

In carrying out my present invention, for example in the manufacture of a gypsum wallboard, I use as the preferred ingredients of the core a calcium sulfate hemihydrate plaster and an especially prepared fibrous filler obtained by fine grinding of ordinary paper such as newspaper and the like in an attrition or hammer mill, which latter is capable of producing a very fine, fluffy product of extremely low density. The other ingredients of the core are such as are well known in the art and involve retarders, accelerators, bonding agents, and, if a lightweight product is desired, density reducing agents. These density reducing agents may be gas-producing and entraining materials which will produce foam in situ, or gas-entraining materials which produce a foam by beating the slurry, but I find it preferable to employ previously prepared foam for this purpose, which foam may be made by whipping a solution of casein and rosin soap into foam. The manner of doing this is already well known in this art and hence needs no further detailed description. However, I find that by the conjoint use of foam with the finely ground paper fiber I, in some way not clearly understood, greatly increase the efficiency of the foam. It appears as though the individual fine paper fibers, particularly when used in accordance with the present invention and at a time when they are not thoroughly swollen with water, orient themselves at the interfaces of the foam bubbles so as to interpose between the individual bubbles little walls of paper fiber which prevent the merging of the smaller bubbles to form larger ones and hence maintain the uniform cellularity of the foam in substantially its original condition. Furthermore, these fibers keep the foam at substantially its original volume, so that the full benefit of its density reducing properties is maintained. I consider this to be an important feature of my present invention.

As an example of the manufacture of ⅜-inch wallboard having a weight of 1350 pounds per thousand square feet, but without in any way wishing to limit my invention thereby, I will now give a formula which has in actual practice been found to be highly satisfactory. Variations in the amounts given in the formula are contemplated by me and hence this formula is to be understood as strictly an example.

| | |
|---|---|
| Calcium sulfate hemihydrate plaster pounds | 1000 |
| Dry partially dextrinized corn or wheat flour paste pounds | 3 |
| Rosin soap do | 2½ |
| Modified starch do | 13 |
| Fluffy finely ground paper fiber do | 10 |
| Commercial retarder ounces | [1] 2 |

[1] Approximately.

In carrying out the process, the above amounts of dry paste, calcium sulfate hemihydrate plaster, fiber, and retarder are first thoroughly mixed in dry condition so as to secure accurate and uniform distribution of the paper fiber throughout the calcium sulfate hemihydrate powder. This mixture is then rapidly mixed with the required amount of water, which can be done in a high-speed centrifugal mixer, although any other method of rapidly mixing the material with water will be considered an equivalent. A centrifugal mixer which has been found suitable for the present purpose is the one described in the patent to Pfeffer & Trotter, No. 1,758,200. If no foam is to be used, this material is then rapidly placed between the paper liners in the usual manner. However, in order to obtain the full benefits of the present invention, the wetted mixture of calcium sulfate hemihydrate plaster, fiber and retarder has incorporated therewith a suitable fluid foam made from rosin soap or similar foaming material, as already mentioned, a foam being used which weighs from 10 to 30 pounds per cubic foot. An excellent foam for the purpose can be produced by whipping a solution containing modified starch, casein or glue, and rosin soap, this foam being superimposed upon the forwardly flowing mass of wetted calcium sulfate mixture and then incorporated therewith by the use of a suitable mixing vessel so that eventually there will be produced a mixture of all of the ingredients with the foam, which will be thoroughly and uniformly disposed throughout the potential core material. This core material is then deposited upon the fibrous liners or paper liners and formed into the board in the conventional manner, which includes passing the board under a heavy ironing belt immediately after forming it. Although the dry paste may be omitted, I find that it is a quite desirable ingredient, as it increases the effectiveness of the bond between the core and the liners. The modified starch may also be omitted, in which case however the quantity of dry paste should be increased.

My use of very finely ground paper fibers is not to be confused with the prior art practice of adding about 25 pounds of coarse wood fiber per thousand square feet of ⅜-inch board. Such coarse wood fiber does not serve as a physical reinforcing means, as does the fiber used in the practice of my present invention. I may state that the amount of finely divided paper fiber represents about ¼% to about 10% by weight of the total amount of calcined gypsum which is used in the board. However, for lightweight board more fiber is desirable. For example, I prefer to use approximately 50 pounds of fiber in a board ½ inch thick and weighing 800 pounds per thousand square feet, while for a heavy type board less fiber is desirable; thus, in a board ⅜ inch thick and weighing about 1600 pounds per thousand square feet I prefer to use approximately from 10 to 20 pounds of fiber.

As a source for the finely divided fluffy fiber which I employ, I may use either sized or unsized paper stock, such as old newspapers, old issues of magazines, books, chip paper, felt, rag paper, cotton linters, and the like; but it will also be within the scope of my invention to use freshly made chemical paper pulp such, for example, as sulphite pulp, or ground wood pulp. In subdividing the paper, I prefer to employ an attrition or hammer type of mill which will produce a very fine fluffy material substantially free from large particles or so-called "confetti." The fibers should preferably approach the individual and unaggregated state, be distinctly fibrous, and not reduced to a dust.

The fiber employed in carrying out the present invention consists of varying sizes from dust up to lengths of approximately 4 millimeters, including a portion that consists of fiber agglomerates, i. e., numerous fibers adhering to each other. By far the greater proportion, however, consists of fibers having a length between 0.25 and 1.0 millimeter. The average thickness of the individual fibers is from 0.01 to 0.04 millimeter. It will be seen that this fiber is altogether different from cut up paper or confetti and is rather the fiber much as it was before it had been laid into a sheet in the manufacture of the paper. The method of reducing the paper, or other raw material, is such that it is virtually taken apart instead of being merely cut up fine.

In the present invention the cement used may be calcined gypsum, Portland cement, magnesium oxychloride, or the like. The product may be in block form, board form, etc. Gas-forming materials, as for example calcium or magnesium carbonate and aluminum sulfate, may be used to produce gaseous voids in the slurry. In place of the rosin soap, other foaming agents such as saponin, soap bark, licorice root or synthetic foaming and surface tension reducing substances may be used. Furthermore, the slurry of gypsum, foam and fiber, or of gypsum and fiber, may be relatively heavy and recourse be had to the vibration of the core by mechanical means to assist in shaping the slurry to the desired form between the paper liners. Thus the board, immediately after the slurry has been placed on the lower paper liners, may be passed over a rapidly vibrating plate which tends to form the slurry to the desired shape. I find the invention particularly applicable to the manufacture of gypsum wallboard, with a core of gypsum cement enclosed between paper liners.

An important consideration is the avoidance of having the fibers become waterlogged, for if they do, they expand in size. Then, when the final product, after setting, dries, these fibers will shrink on drying and will either set up stresses in the product or actually break away from the surrounding cementitious material, thus losing their reinforcing effect. In certain prior art patents, wet paper fibers have been added to cementitious slurries, with the undesired action just explained. Even if dry fiber be added to a cementitious slurry, and either considerable time elapses before it sets or pressure is applied to it to condense its volume, water will enter the fiber and waterlog it to an undesired extent. All this is avoided in the carrying out of the present invention by so controlling the time factors that the fiber will be incorporated with the mass of cementitious material and the latter will set before such saturation of the fiber with water takes place.

In making, for example, gypsum board, wallboard or gypsum blocks, the time that the gypsum slurry is being actively mixed or agitated is from but 0.5 to 10 seconds, with an upper limit of 3 minutes. In making wallboard, the time elapsing between the addition of the water to the calcined gypsum and the fiber and the formation of the board beneath the master rolls of the board machine varies from 10 seconds to 100 seconds, and the total time elapsing between the addition of the water and the time of setting varies between the limits of from 3 to 15 minutes. It will thus be seen that the longest time the fibers can be in contact with water before the mixture sets is about 15 minutes.

An important feature is that the dry fibers should be incorporated into the final formed product before they have taken up more than two or three times their weight of water, whereas such fibers, if allowed to do so, will take up ten to twenty times their weight of water. When gypsum board is formed, for example, after the mix is between the liners, the unsatisfied fibers begin to absorb water from the surrounding mix and to give a very desirable "set" or stiffening to the board, allowing the production of a smoothly ironed surface, and true and strong edges, and allowing the production of a good bond of core to liners by preventing over-wetting of the liners and the core at their interface.

This invention is applicable to and valuable in heavyweight board of about 2800 pounds per thousand square feet of ⅜-inch thickness or lightweight board of about 800 pounds per thousand square feet of ½-inch thickness, or in board between these weights. In either case the board is toughened to the maximum degree without the weakening effect of added, excess water.

I would state, in conclusion, that while the examples described constitute the practical embodiments of my invention, I do not wish to confine myself specifically to these details, since manifestly they may be considerably varied without devarting from the spirit of the invention as defined in the appended claim.

Having described my invention, I claim as new and desire to secure by Letters Patent:

The process of producing a set calcium sulfate dihydrate product which comprises the steps of mixing calcined gypsum with water and with not substantially exceeding 10% of dry comminuted cellulosic fibers having a diameter of from about 0.01 to 0.04 millimeter and a length of from about 0.25 to 1.0 millimeter; incorporating a foam with the mixture of water, calcined gypsum, and fibers; forming the mixture to its intended shape within a period not substantially exceeding 100 seconds after said mixing thereby avoiding waterlogging of the added fibers; and effecting the setting of the mixture within a period not substantially exceeding 15 minutes so as to prevent undesired excess swelling of the fibers prior to the setting having taken place, whereby to form a lightweight set-hardened product.

GEORGE D. KING.